United States Patent [19]
Baltensperger et al.

[11] Patent Number: 5,201,470
[45] Date of Patent: * Apr. 13, 1993

[54] METHOD FOR THE PRODUCTION OF MILLED GRAIN PRODUCTS AND ROLLER MILL

[75] Inventors: Werner Baltensperger, Oberuzwil; Robert Linzberger, Abtwil, both of Switzerland

[73] Assignee: Buehler AG, Uzwil, Switzerland

[*] Notice: The portion of the term of this patent subsequent to Jan. 30, 2007 has been disclaimed.

[21] Appl. No.: 794,296

[22] Filed: Nov. 14, 1991

Related U.S. Application Data

[63] Continuation of Ser. No. 350,702, Mar. 22, 1989, abandoned.

[30] Foreign Application Priority Data

Oct. 6, 1987 [CH] Switzerland .................. 03893/87
Oct. 6, 1988 [WO] PCT Int'l Appl. .................. PCT/CH88/00182

[51] Int. Cl.⁵ .................................................. B02C 9/04
[52] U.S. Cl. .................................... 241/13; 241/29
[58] Field of Search .................................. 241/6-13, 241/29, 37, 135, 143, 159, 76

[56] References Cited

U.S. PATENT DOCUMENTS

| 453,364 | 6/1891 | Taylor | 241/9 X |
| 759,781 | 5/1904 | Wallace | 241/159 |
| 4,140,285 | 2/1979 | Linzberger et al. | 241/37 X |
| 4,220,287 | 9/1980 | Boczewski | 241/9 |

FOREIGN PATENT DOCUMENTS

| 115440 | 5/1984 | European Pat. Off. | 241/159 |
| 2730166 | 1/1978 | Fed. Rep. of Germany . | |

Primary Examiner—Douglas D. Watts
Assistant Examiner—Clark F. Dexter
Attorney, Agent, or Firm—McAulay Fisher Nissen Goldber & Kiel

[57] ABSTRACT

In a method for producing milled grain products by means of repeated roll grinding and sifting of specific product fractions, the material to be milled is at least partially guided via double-grinding passes without intermediate sifting. An eight-roll mill is used for this purpose, which eight-roll mill is constructed as a double unit with two roll pairs arranged at a distance one above the other and can be used in quantity in a grain milling system or also in combination with single-grinding passes constructed as four-roll mills. Compared with the use of known four-roll mills, the economic efficiency of a mill is accordingly improved while completely retaining the adaptability of the mill to specific grinding tasks, the quality of the material to be milled and/or the ability to monitor the grinding process.

4 Claims, 3 Drawing Sheets

METHOD FOR THE PRODUCTION OF MILLED GRAIN PRODUCTS AND ROLLER MILL

This application is a continuation, of application Ser. No. 350,702, filed Mar. 22, 1989 new abandoned.

TECHNICAL FIELD

The invention is directed to a method for the production of milled grain products, such as flour, semolina, middlings. [Translator's Note: "Semolina" is an English translation of the German word "Griess" defined as granulated, hulled wheat used for cooking. "Middlings" is an English translation of the German word "Dunst" meaning a type of flour whose degree of fineness is between that of flour and "semolina".], etc., by means of repeated roll grinding and sifting out specific product fractions in accordance with the system of advanced milling.

BACKGROUND ART

In the production of bread flour, two fundamentally different milling methods are known. Whole-grain or integral/dark flour has been made for a long time by means of grinding the entire kernels once, twice or three times by way of one, two or three grinding passes and possibly sifting out a portion of the hulls or the outermost layer of the kernel.

This system has acknowledged advantages. Virtually all constituents of the kernel remain integral and provide high-value nutrition for persons via bread and other grain products. However, it is equally recognized that this old method, often called flat milling, also has disadvantages. The products yielded by means of integral grinding have only a limited storage life. The corresponding health products are usually intended for immediate consumption. Dirt, bacteria, fungus spores, etc. usually adhere chiefly to the outside of the kernel, on the hull. It is precisely these impurities which destroy the quality of the products and reduce their storage life or increase the risk of spoilage for the milled products and impair the quality of the end products.

The fact that the grain kernel is composed of many very different parts is often ignored. These various parts give the end products of a mill, i.e. the flour, semolina and/or middlings, the required properties, e.g. specific baking characteristics. The possibility of recovering the various parts of the milling kernel in isolation from one another is a precondition for controlling these quality criteria. Such products needed for a specific requirement cannot be separated in an economical fashion in simple flat milling with only a few grinding passes. It is only so-called advanced milling which allows the production of the multitude of starting products presently required for today's modern eating habits.

The modern method is so-called advanced milling which is characterized by a frequently repeated grinding and sifting after every grinding. Until two or three decades ago, this process was often repeated 15 to 20 times. The most recent developments have succeeded in proving that an average of twelve to fifteen grindings already leads to the same results with proper management. Since the early seventies, the short advanced milling method has taken precedence over the previously applied advanced milling method as state of the art throughout almost the entire world.

A good miller is capable of achieving the standard of quality required by industries receiving the product for further processing, e.g. bakers, dough products factories, etc. even from sharply diverging raw materials by means of mixing the different grain qualities and appropriate direction of the milling.

It is well-known that in order to remain in competition the mill must produce a determined quantity of high-quality, and accordingly high-price, end products from a determined quantity of raw materials. That is, a grain mill constantly strives to achieve a high output of light flour, semolina, etc. A mill only operates well when the output is high and the quality criteria are maintained simultaneously. An important aspect of the overall economic efficiency is the extent of required machinery, which, in a mill, depends e.g. directly on the quantity of grinding and sifting units and the necessary space. All recent efforts have shown that the grinding in traditional milling cannot be further reduced without directly reducing the output or the quality of the milled products. To this extent, a stagnation has been observable in the development of the grinding process in milling for some years.

SUMMARY OF THE INVENTION

The invention has as an object of developing a new milling method whose use can increase the economic efficiency of a mill, preferably while completely maintaining the flexibility and adaptability of the mill to the respective specific milling work, the quality of material to be milled and/or the ability to monitor the milling process.

The solution, according to the invention, is characterized in that the material to be milled is guided repeatedly through double-grinding passes without intermediate sifting, wherein every grinding can be controlled and monitored individually.

The material to be milled is thus sifted preferably after every double grinding.

Tests with the method according to the invention have confirmed to the surprise of all participating persons trained in the field that the proposed object could be met in its entirety. In observing these tests, it was interesting to note that a triple grinding without intermediate sifting, as was practiced to some extent in the early stages of modern milling, produced clearly inferior results. This may have been due to excessive heating of the material, but probably, for the most part, to the fact that in a triple grinding without intermediate sifting a considerably greater portion of the material to be milled is reduced in size in a disadvantageous manner or an excessive portion of fine material is produced at a premature stage. Herein lies one of the most important secrets of mill grinding, namely that every work step is carried out so that it can be monitored and overseen individually. The chief miller, with his experience, knows what he is doing at every stage. Therefore, in practice, special conditions are created in every grinding stage, e.g. by means of adjusting the grinding gap, special corrugation or differential of the grinding rolls, throughput through a grinding pass, etc.

An especially surprising fact was that the double-pass grinding could be used advantageously not only in the first two bruising passes, that is in $B_1/B_2$, but also, e.g., in the first subsequent reduction passes $C_1/C_2$. Moreover, the double-pass grinding could even be successfully employed additionally, at least with a majority of the raw materials, in $B_3/B_4$ or e.g. $C_3/C_4$. In addition, only one, two or three of the four possibilities mentioned can be made use of and only a single grinding with subsequent sifting can be used in all the remaining passes. When the quality of raw grain is very uniform, all milling passes can be designed as double-milling passes.

The method, according to the invention, thus introduces a multifold development for the grinding method, which consists, for example, in that the mill has a combination of double- and single-grinding passes, wherein the material to be milled is sifted between every double-grinding pass and every single-grinding pass.

This leads to a whole range of advantageous possibilities of variation. As is known, most milling machines have a long service life. In applying the new idea, many existing mills can increase the milling output without problems relating to space, namely by means of installing one, two, three, four or more double-grinding passes. Since a corresponding quantity of sifting passes are also dispensed with, more capacity can be accommodated within an existing mill building. Another possibility consists in that a new mill building can be utilized in optimum fashion by means of goal-oriented selection of corresponding single- and double-grinding passes, wherein the quantity of installed machines is reduced in comparison with the prior art, which ultimately expresses itself in terms of initial costs. Nevertheless, the same quality variables can be guaranteed, because the possibilities for access in the management of the milling are unchanged.

It is especially preferable that the material be guided through double-grinding passes at least twice, e.g. by means of combining $B_1/B_2$ and $C_1/C_2$ and/or $B_1/B_2$ and $B_3/B_4$ and/or $C_1/C_2$ and $C_3/C_4$, wherein the material is sifted after every double-grinding pass.

The invention also relates to a roll mill for grinding grain for the production of flour, semolina, middlings, etc., particularly for use with the method according to the invention, and is characterized in that it comprises a double unit with two roll pairs arranged one above the other at a distance from one another. This is also referred to as an eight-roll mill in the following.

A new possibility for monitoring is also created now for the miller in the form of the eight-roll mill, in that two grinding stages can be overseen directly at the same time and in the same place. This means that a change e.g. in the first pair of grinding rolls as well as in the second pair of grinding rolls, and also the influence of the change in the first pair of grinding rolls on the grinding results of the second pair of grinding rolls, which may be unchanged as the case may be, can be appraised immediately. To the knowledge of the present Applicant, this has never been possible previously in the field of advanced milling. Because sifting was carried out between every grinding, not only was it necessary in the prior art to wait a corresponding period of time until the material had passed the sifting and the second grinding stage, but the composition of the material to be milled was also changed as a result of every intermediate sifting in that individual fractions were guided to different passes. It has been shown that the slight disadvantage, that a small portion is reduced in size unnecessarily in the second grinding, is more than compensated for by the advantage of the possibility of direct monitoring as well as immediate accessibility to both grinding roll pairs.

In an especially preferred manner, a product outlet funnel, which comprises a control gate in each instance for monitoring the material to be milled after every grinding, is arranged under every roll pair.

But the milling management remains virtually unchanged for the miller with respect to the grinding, even though the new solution brings about entirely unexpected advantages. The new idea does not require that two consecutive grindings be effected without visual access; rather, the grinding results of both reductions can be monitored by means of directly monitoring the first and second stage of every double-grinding stage. This has proven to be very important, since mill grinding is not merely a matter of reduction, but, rather, a multiple-step careful opening of the kernel, detaching of the endosperm portion, and careful grinding of the semolina portions, e.g. for semolina, intended for the production of dough products, etc. Therefore, the criteria for making a judgement are not simply the distribution of kernel sizes, but also the visual impression of the first bruising, the feel of the milled products, color, proportion of fine flour, etc. But other factors are likewise significant, such as the state of the rolls, sharpness of the corrugation, manner of operation of the blade wipers and roll brushes, etc. Therefore, it may be said without exaggeration that the sum of these parameters, which are often considered as secondary factors by milling personnel not completely trained in the field, have an importance in practice equal to that of the grinding gap, which can easily be monitored automatically. Without a knowledge of these facts, a supposed technical advance has actually turned out to be a regression which ultimately requires expenditures far in excess of the savings intended through the attempted advance, as has recently happened in quite a few technical fields.

In addition, every roll pair is preferably completely equipped with an individual adjusting device and means for protection against foreign bodies.

However, the new invention offers very different ways of operating, which were not previously advisable in mill grinding. Thus, an overriding control of the two grinding roll pairs, which lie one on top of the other, or of only one grinding roll pair, can follow the actual motor output consumption in relation to the throughput. In so doing, it is possible to control only one of the two roll pairs, preferably the upper roll pair, with respect to a determined distance between the rolls via automatic means. Accordingly, a long-entertained desire—namely a determined preset automatic control of all grinding gaps and the control of the intensity of the grinding work via the motor-output consumption of a plurality of double-roll pairs—can be realized.

In addition, it has proven particularly advantageous for management, particularly the monitoring of the machine as well as the grinding work, that the rolls of a roll pair are arranged in a horizontal plane. For example, this allows the rolls to be changed easily and allows every pair of rolls to be designed as an exchangeable constructional unit.

If the feed space is aspirated in conjunction with the discharge of product through the product outlet funnel, dust can be prevented from exiting, in particular there is no interference in the monitoring of the grinding work when the control doors for the upper grinding roll pair or for the lower grinding roll pair, or both, are opened.

Another precondition of mill grinding is that the grinding rolls of each grinding roll pair have different rotational speeds in the majority of passes, wherein all rolls of an eight-roll mill preferably have the same diameter, as a rule.

The two roll pairs arranged directly one above the other share control means for moving the movable rolls in and out. (In the presence and in the absence of the material to be milled, respectively.)

Another particularly advantageous design idea consists in that each grinding gap adjusting device is assigned to a remote control and computing means for storing and recalling the specific grinding gap adjustments for each grinding task as well as all other adjustment variables of the processing and transporting machinery.

The invention is now explained in more detail with the aid of some embodiment examples.

DESCRIPTION OF THE PREFERRED EMBODIMENTS

Figure 1:
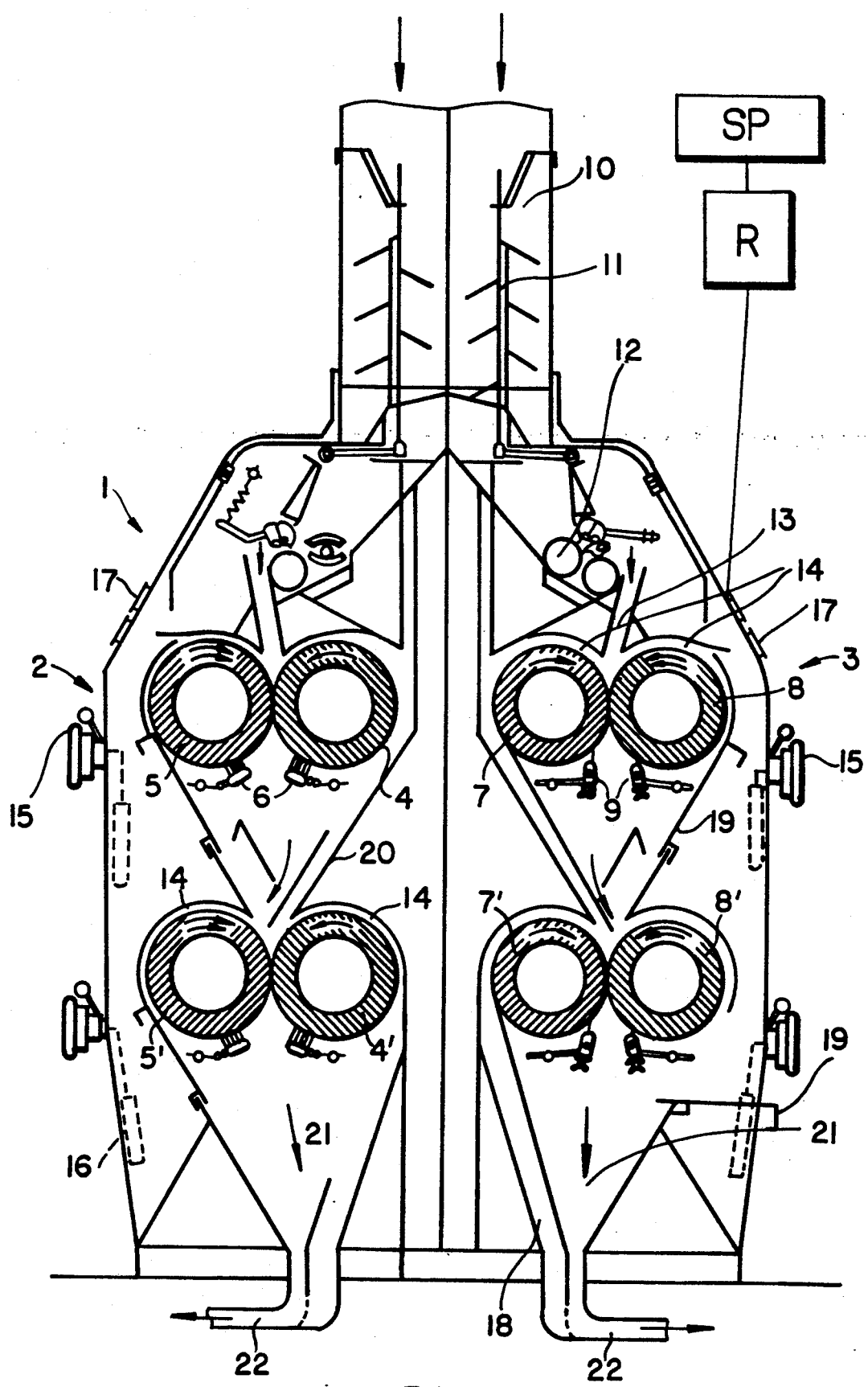
FIG. 1 shows a new eight-roll mill in cross section.

Reference is new made to FIG. 1. The eight-roll mill 1 comprises two halves, the left half is shown as a bruising pass 2 and the right half is shown as a second reduction pass 3. The bruising pass 2 usually has corrugated rolls 4 and 5, respectively, wherein the roll 5 which runs more rapidly is designated in the drawing with two arrows. A wiping brush 6 is located below each roll 4 and 5. Rolls 7 and 8, respectively, which are smooth for the most part, are used in the second reduction passes and wiping blades 9 are used for keeping the surface of the rolls clean. Depending on the specific grinding operation, the respective lower roll pair 4', 5' or 7', 8', respectively, will be the same roll type, coarse corrugation, fine corrugation, or will be constructed as a smooth roll, as the corresponding upper roll.

The material is guided to the left or to the right into the roll mill 1 via a feed cylinder 10. Only in very large milling capacities is it indicated to construct the left-hand and right-hand roll mill halves identically in such a way that each half must process one half of the product volume. In the drawing, a sensor 11 in the feed cylinder 10 is designed as a so-called "Christmas tree" which controls a product feed 12, so that an arriving quantity of material which flows into the feed cylinder 13 at the top is discharged in the same magnitude by means of the product feed. The material is guided directly into the grinding gap via a feed duct 13. A strong air current is generated in the feed duct 13, which can be ensured in an advantageous manner by means of two air ducts 14 which are guided around the rolls 4, 5 and 7, 8, respectively. The material which is bruised by the upper roll pair 4, 5 is guided directly into the grinding gap of the lower roll pair 4', 5' via a product outlet funnel 20. The air is also aspirated through the air ducts 14 at the lower roll pair 4', 5'. A transfer unit 22 transfers the material to be milled to the intermediate liftovers by means of a product outlet funnel 21. All four roll pairs 4, 5 - 4', 5' -7,8 - 7', 8' can be adjusted with respect to the grinding gap by means of an adjusting device 15. All other devices, such as the means for protecting against foreign bodies, the engaging and disengaging device, etc. are used in the same manner as in standard four-roll mills. In this connection, reference is made to DE-PS No. 27 30 166 in its entirety. It has been shown that the constructional unit for the roll pair which is shown in the aforementioned publication of the present Applicant can also be used to great advantage with the eight-roll mills, so that when eight-roll mills are combined with four-roll mills the same basic construction of the so-called roll package can be taken as a basis in every case, which is an additional advantage for both the manufacturer and the user.

In individual cases, it can be indicated to provide a feed roll or product distribution roll, respectively, above the lower roll pair. However, it is preferable that the engagement and disengagement of the roll be effected for both roll pairs by means of the same sensor 11.

The right half of the drawing also shows an air path 18 in the product outlet funnel 21. This can be advantageous particularly with milling materials of the middlings and flour types, since a more compact guiding of the falling stream of material is made possible by means of separate air and product paths.

Every grinding roll pair (4, 5 - 7, 8) comprises its own grinding gap adjusting device which consists of a handwheel 15 and the corresponding adjusting elements. In addition, a motor-driven adjusting device 16 can be provided, wherein both can monitor the instantaneous distance variable between the two grinding rolls via a display 17. Moreover, the motor-driven adjustment can be effected automatically by means of computers (R) and storage means Sp.

In addition, a control gate 19, which is shown in the right half of the drawing in the closed position at the top and in the opened position at the bottom, is assigned to each grinding roll pair. The control gate can be opened regardless of whether or not the roll mill is operating. Constant air pressure conditions and, accordingly, constant grinding conditions, are thereby maintained by means of the additional air ducts 14, 18 described above.

Figure 2:
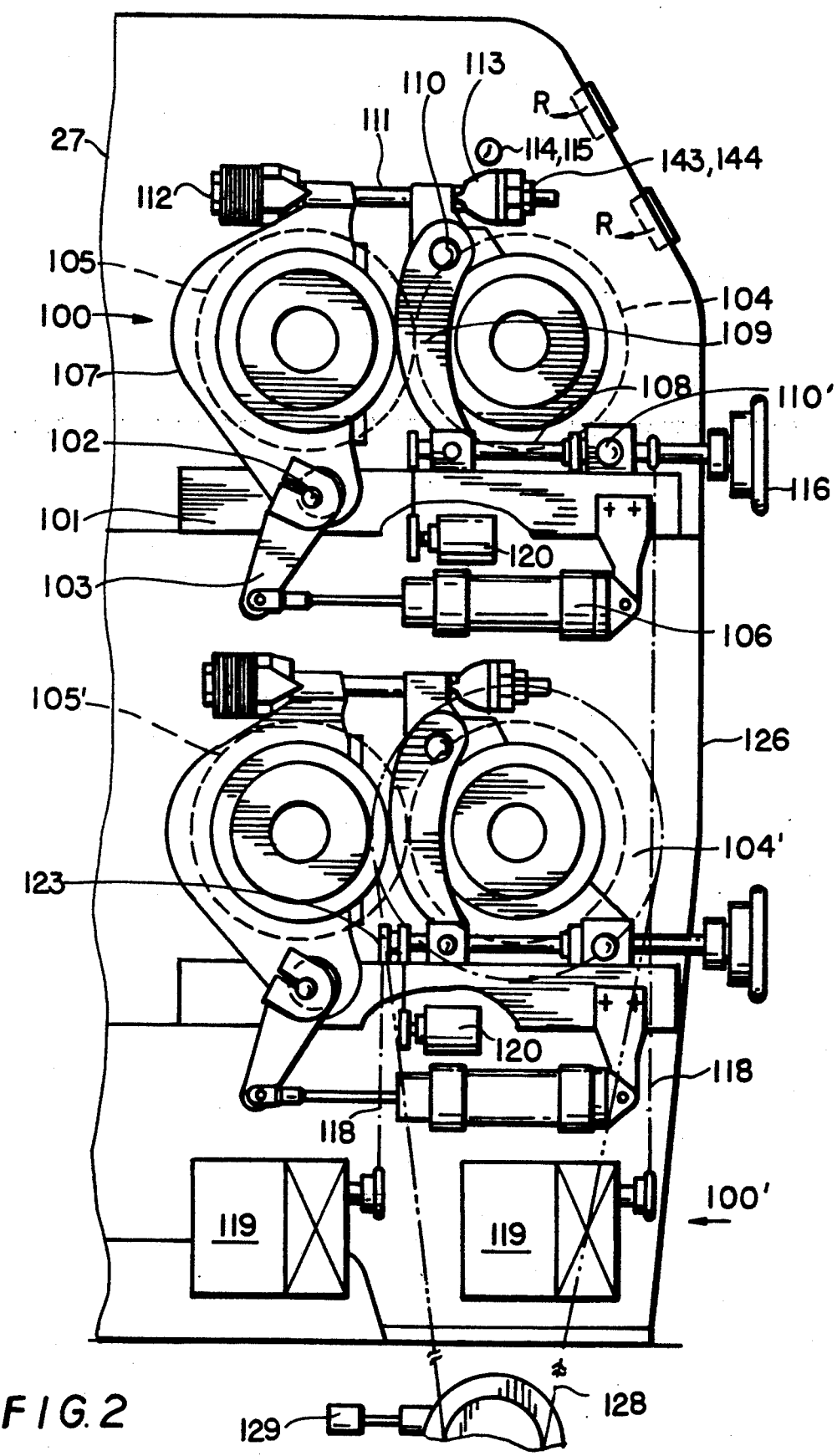
FIG. 2 shows a schematic side view of FIG. 1 with bearing support, grinding roll adjustment, drive, etc.

Reference is made in the following to FIG. 2 which shows adjusting member as a constructional assembly 100 and a controllable adjusting drive 100'. The two grinding rolls 104 and 105 are supported on a mutual carrier 101. The movable roll 105 is fastened at a stationary eccentric pin 102 so as to be swivelable, wherein the inward and outward movement is controlled by means of a corresponding lever 103, as well as a disengagement cylinder 106. The eccentric pin 102 is rotated by means of the swiveling movement of the lever 103 and causes a horizontal displacement of the lower portion of a swivelable bearing housing 107, so that the spacing of the two grinding rolls can be pre-adjusted. This device would be less suited for exact adjustment of the grinding rolls. Also, this is only used for bringing the grinding rolls into a moved-in or moved-out position or into two fixed positions. The actual fine adjustment of the grinding rolls 104 and 105 is effected via an adjusting spindle 108 which directly moves an adjusting arm 109 around a stationary pivot bearing 110 by means of rotation. The upper, shorter end of the adjusting arm 109 is connected with the swivelable bearing housing 107 in a force-locking manner via a tie rod 111. The transmission of force is effected via knife edges which are part of an overload spring protection device 112 on one side. On the opposite side, an adjustable pressure head 113, as well as a pressure measuring device 114 with pressure display apparatus 115, are arranged at the tie rod 111. In order to be able to adjust the grinding rolls in a parallel manner during servicing operations, a correction can be effected on the respective necessary side via adjusting screws 143, 144. The adjusting spindle 108, is held so as to be stationary by means of the bearing 110', and can now be actuated via a handwheel 116, which has a display clock directly built into it, or by means of motor power, transmission chain 118 and a gear motor or drive motor 119, respectively. The drive motor 119 is fastened at the roll mill 126 and communicates directly with the adjusting spindle 108 via a slip clutch and a chain wheel.

In addition, a position indicator 120 is directly connected with the adjusting spindle 108, so that every movement of the chain wheel 123 and handwheel 116, respectively, is recorded in the position indicator 120 and guided further to the desired position. In FIG. 2, in addition, a drive belt 128 for the drive of the grinding rolls 104 and 105, 104' and 105', respectively, is only shown in a suggestive manner. It is possible also to provide an electric power requirement measuring and display device 129 in the drive system. The electric power consumption can accordingly be defined at a lower and upper value, for example, and e.g. one or both grinding roll pairs can be moved apart when the preselected range is exceeded. But the electric power consumption can accordingly also be controlled, for example, as a function of the lower grinding gap, wherein the upper grinding gap can be adjusted by means of the automatic arrangement so as to be fixed.

All signals of a roll mill are preferably coordinated and controlled via a machine computer R, wherein the machine computer R can request the necessary desired values from a central computer with storage Sp. The position indicator is preferably equipped with a position limiting value switch which is adjustable to preselectable limiting values and can impede an automatic faulty adjustment in this way. A position limiting value switch has the advantage that a faulty manual adjustment can also be prevented accordingly, since both the handwheel and the automatic adjustment result in a corresponding distance displacement of the chain 118. In the same way as the adjusting motor 119, the position indicator can be connected with an input-output device which receives and transmits corresponding signals from the machine computer R, corresponding to the digital display and manual input keys. In the same way, the pressure measuring and display device 114, 115 can be connected to the machine computer. Depending on the degree to which a roll mill can be expanded, one or more protection devices can be provided at the same roll mill. If, for example, corrugated rolls are installed, monitoring of the grinding pressure is less important; on the other hand, the monitoring of the spacing of the grinding rolls, whether this be effected by means of the position indicator or a distance measuring device, is advantageous. The opposite applies to smooth rolls in which a monitoring of pressure is more advantageous. A computer and the signal lines, which are indicated in a suggestive manner, are supposed to indicate that the computer and memory, respectively, control an entire range of roll mills in a mill, possibly all of them, and, if necessary, also coordinate control functions.

In addition, it has proven to be especially advantageous that the digital display transmit a value corresponding to a time measurement (clock 05:50) and preferably transmits an identical value corresponding to a position indicating apparatus or display clock of the handwheel, respectively.

The great advantage consists in that the experimental values of roll mills which are not automated and not remote-controllable are compared and can be evaluated for constructing or improving corresponding control programs.

Figure 3:
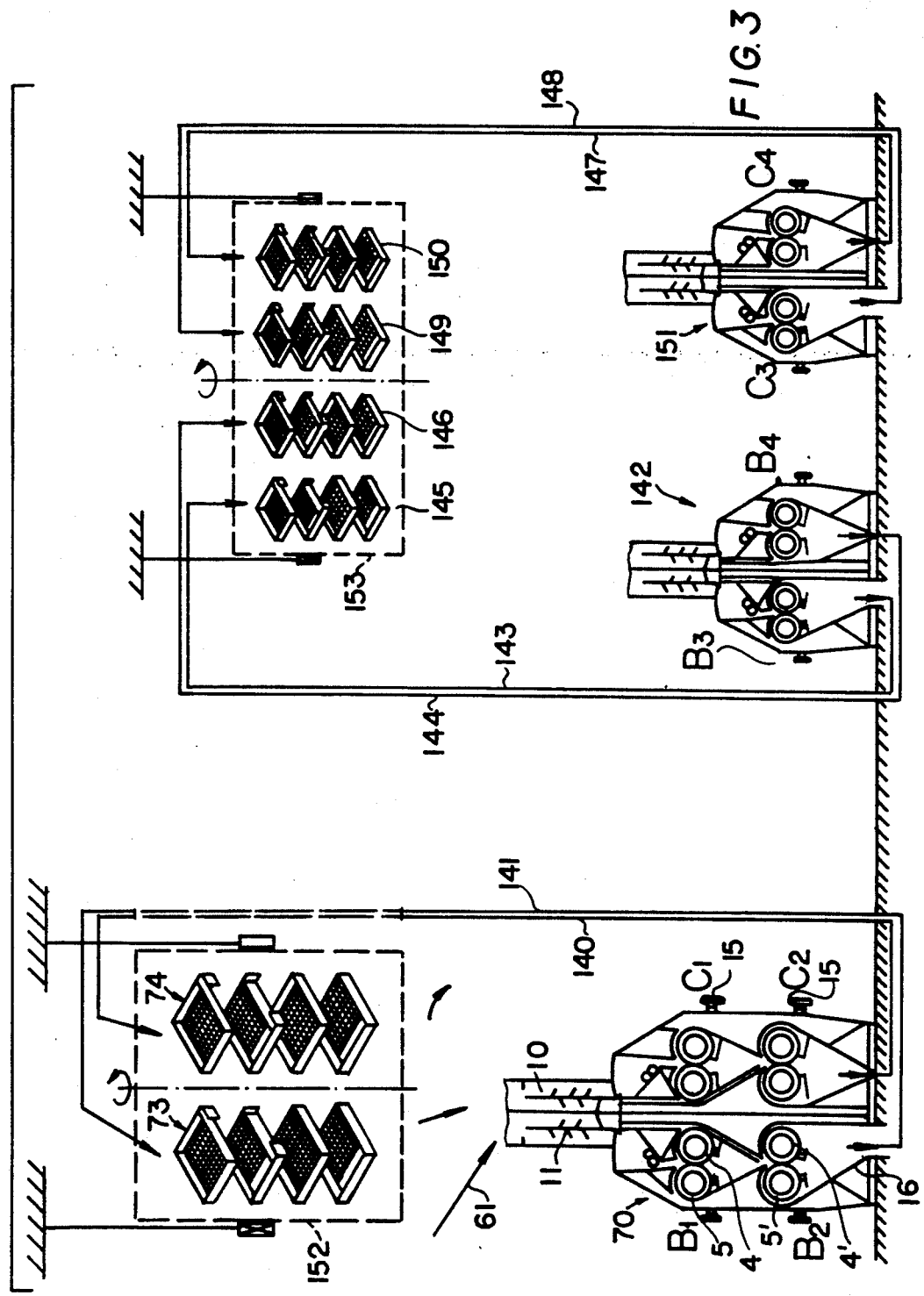
FIG. 3 is a schematic view of the grinding and sifting as an embodiment example.

FIG. 3 is referred to in the following. FIG. 3 shows the combination of double-grinding passes and single-grinding passes. The double-grinding passes $B_1/B_2$ and $C_1/C_2$ are comprised in a single eight-roll mill 70. A conveyor line 140 brings the milling material of the first double grinding $B_1/B_2$ to the first large sifter division 73. The third bruising $B_3$, as well as the fourth bruising $B_4$, are ground in a single-grinding pass in a 4-roll mill 142. Lift-overs 143 and 144, respectively, bring the third and fourth coarse ground material, respectively, to the corresponding sifter divisions 145 and 146, respectively. The first two reduction passes $C_1$ and $C_2$ are executed in turn as double grindings. The material resulting from $C_2$ is guided into the second large sifter division 74 via a pneumatic transporting line 141. The reducing passes $C_3$ and $C_4$ are formed in turn as single-grinding passes (four-roll mill 151) and the corresponding products are conveyed by lift-overs 147 and 148, respectively, into the corresponding third and fourth sifter divisions 149 and 150, respectively. The following reduction passes, like the rear bruising passes, not shown, can be constructed according to the specific requirements of the mill, be this as double- or single-grinding passes. The large-surface area sifters 73, 74, etc. can be comprised in a special large plan-sifter sifter 152, the sifter divisions 145, 146, 149, 150 are likewise comprised in a plansifter 153 corresponding to the state of the art.

While the foregoing description and drawings represent the preferred embodiments of the present invention, it will be obvious to those skilled in the art that various changes and modifications may be made therein without departing from the true spirit and scope of the present invention.

What is claimed is:

1. A method for production of milled grain products, by means of repeated roll-grinding and sifting of specific product fractions, corresponding to a system of advanced milling, comprising the steps of:
   guiding the material to be milled through a combination of double-grinding passes, each having no more than two grinding passes, and single-grinding passes without intermediate sifting in each double-grinding pass;
   controlling and monitoring every grinding pass individually; and sifting the material to be milled between double grinding passes and single grinding passes.

2. Method according to claim 1 including the step of guiding the material through two double-grinding passes, including a first bruising pass $B_1/B_2$ and a first reductive pass $C_1/C_2$.

3. Method according to claim 1 including the step of guiding the material through two double-grinding passes including a first bruising pass $B_1/B_2$ and a second bruising pass $B_3B_4$.

4. Method according to claim 1 including the step of guiding the material through two double-grinding passes including a first reduction pass $C_1/C_2$ and second reduction pass $C_3/C_4$.

* * * * *